(12) United States Patent
Wang et al.

(10) Patent No.: US 10,782,466 B2
(45) Date of Patent: Sep. 22, 2020

(54) BACKLIGHT MODULE AND DISPLAY APPARATUS

(71) Applicant: Coretronic Corporation, Hsin-Chu (TW)

(72) Inventors: Wen-Chun Wang, Hsin-Chu (TW); Chong-Yang Fang, Hsin-Chu (TW); Shih-Yi Lin, Hsin-Chu (TW); Chin-Ku Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 432 days.

(21) Appl. No.: 15/435,311

(22) Filed: Feb. 17, 2017

(65) Prior Publication Data

US 2017/0269283 A1    Sep. 21, 2017

(30) Foreign Application Priority Data

Mar. 16, 2016    (TW) .............................. 105108010 A

(51) Int. Cl.
*F21V 8/00*    (2006.01)
*G02F 1/1333*    (2006.01)
(Continued)

(52) U.S. Cl.
CPC ......... *G02B 6/0055* (2013.01); *G02B 6/0016* (2013.01); *G02B 6/0053* (2013.01);
(Continued)

(58) Field of Classification Search
None
See application file for complete search history.

(56) References Cited

U.S. PATENT DOCUMENTS 5,742,365 A * 4/1998 Seo ...................... G02F 1/1368
349/43
6,191,833 B1 * 2/2001 Hirakata .............. G02B 6/0053
349/137
(Continued)

FOREIGN PATENT DOCUMENTS

CN    101809489    8/2010
CN    104364703    2/2015
(Continued)

OTHER PUBLICATIONS

"Office Action of Taiwan Counterpart Application," dated Mar. 28, 2017, p. 1-p. 6, in which the listed references were cited.

*Primary Examiner* — Edward J Glick
*Assistant Examiner* — David Y Chung
(74) *Attorney, Agent, or Firm* — JCIPRNET

(57) ABSTRACT

A backlight module includes a light guide plate, a light source, a prism sheet and a reflective structure. The light guide plate includes a light emitting surface, a bottom surface opposite to the light emitting surface, a light incident surface connected with the light emitting surface and the bottom surface and a plurality of micro structures located on the bottom surface or the light emitting surface. The light source is disposed beside the light incident surface of the light guide plate. The prism sheet is disposed above the light emitting surface of the light guide plate, and includes a plurality of prisms facing the light emitting surface. The reflective structure is disposed under the bottom surface of the light guide plate. The reflective structure has a characteristic of changing its reflectivity according to a control signal applied thereto.

15 Claims, 13 Drawing Sheets

(51) Int. Cl.
*G02F 1/1335* (2006.01)
*G02F 1/1368* (2006.01)
*G02F 1/1681* (2019.01)
*G02F 1/1334* (2006.01)
*G02F 1/157* (2006.01)
*G02F 1/167* (2019.01)

(52) U.S. Cl.
CPC ......... *G02B 6/0076* (2013.01); *G02F 1/1368* (2013.01); *G02F 1/133377* (2013.01); *G02F 1/133504* (2013.01); *G02F 1/133512* (2013.01); *G02F 1/133514* (2013.01); *G02F 1/133553* (2013.01); *G02F 1/1334* (2013.01); *G02F 1/157* (2013.01); *G02F 1/167* (2013.01); *G02F 1/1681* (2019.01); *G02F 2202/28* (2013.01)

(56) References Cited

U.S. PATENT DOCUMENTS

| | | | |
|---|---|---|---|
| 6,215,920 B1 | 4/2001 | Whitehead et al. | |
| 2001/0019479 A1* | 9/2001 | Nakabayashi | G02B 6/0018 362/615 |
| 2005/0036083 A1 | 2/2005 | Hayashi et al. | |
| 2006/0098264 A1* | 5/2006 | Park | G02F 1/155 359/265 |
| 2009/0079911 A1 | 3/2009 | Nagato et al. | |
| 2009/0231662 A1* | 9/2009 | Sorensson | G02F 1/15 359/273 |
| 2009/0316070 A1* | 12/2009 | Hwang | G02F 1/133536 349/62 |
| 2012/0147627 A1* | 6/2012 | Pan | G02B 6/0051 362/624 |
| 2012/0274867 A1* | 11/2012 | Shinkai | G02F 1/133606 349/15 |
| 2013/0083260 A1* | 4/2013 | Minami | F21S 8/00 349/15 |
| 2013/0328780 A1* | 12/2013 | Kuroki | G02B 6/0065 345/168 |
| 2015/0002783 A1* | 1/2015 | Park | G02B 6/0081 349/64 |
| 2015/0268404 A1* | 9/2015 | Chiu | G02B 6/0036 362/606 |
| 2017/0227705 A1* | 8/2017 | Araki | G02B 6/0065 |
| 2017/0229062 A1* | 8/2017 | Zeng | G06F 3/041 |
| 2017/0307939 A1* | 10/2017 | Banin | G02F 1/133617 |

FOREIGN PATENT DOCUMENTS

| | | |
|---|---|---|
| TW | 201142361 | 12/2011 |
| TW | 201200950 | 1/2012 |
| TW | 201232122 | 8/2012 |
| TW | 201350939 | 12/2013 |
| TW | 201443520 | 11/2014 |
| TW | I496043 | 8/2015 |
| TW | I514048 | 12/2015 |

* cited by examiner

BACKLIGHT MODULE AND DISPLAY APPARATUS

CROSS-REFERENCE TO RELATED APPLICATION

This application claims the priority benefit of Taiwan application serial no. 105108010, filed on Mar. 16, 2016. The entirety of the above-mentioned patent application is hereby incorporated by reference herein and made a part of this specification.

BACKGROUND

Field of the Invention

The invention relates to a backlight module and a display apparatus and more particularly relates to a backlight module having a reflective structure with an adjustable reflectivity and a display apparatus using the backlight module.

Description of Related Art

Generally, a display is usually provided with a wide viewing angle display effect for several viewers to view an image. However, at certain times or occasions, e.g., reading confidential information or inputting a password, the wide viewing angle display effect may easily result in leakage of the confidential information due to being peeped by others. Therefore, in order to meet the two different demands for providing several viewers and for processing the confidential information in public, a display with an adjustable viewing angle for switching between a wide viewing angle display mode and a narrow viewing angle display mode has gradually become one of the mainstream products.

In an anti-peep mechanism of the conventional display, an anti-peep film may be directly installed on the outer surface of the display. A typical anti-peep film mainly functions in preventing the viewers from clearly reading the displayed information in side viewing angles by means of inhibiting brightness of large view angles, so as to achieve privacy protection. Although this method is simple, and materials used thereby are readily available, the additionally installed optical film may affect optical characteristics and display quality of the display when the display is orthogonally viewed. Meanwhile, whether to enable the anti-peep capability or not is switched also depends on manually detaching and attaching the anti-peep film, which causes inconvenience of use to users.

The information disclosed in this "Description of Related Art" section is only for enhancement of understanding of the Related Art of the described technology and therefore it may contain information that does not form the prior art that is already known to a person of ordinary skill in the art. Further, the information disclosed in this "Description of Related Art" section does not mean that one or more problems to be resolved by one or more embodiments of the invention was acknowledged by a person of ordinary skill in the art.

SUMMARY

The invention provides a backlight module having a reflective structure with an adjustable reflectivity.

The invention further provides a display apparatus using the backlight module and provided with a capability of adjusting a viewing angle.

Other features and advantages of the invention can be further understood by the technical features disclosed in the invention.

To achieve one, part, or all of the objectives aforementioned or other objectives, one embodiment of the invention provides a backlight module including a light guide plate, a light source, a prism sheet and a reflective structure. The light guide plate includes a light emitting surface, a bottom surface opposite to the light emitting surface, a light incident surface connected with the light emitting surface and the bottom surface and a plurality of micro structures located on the bottom surface or the light emitting surface. The light source is disposed beside the light incident surface of the light guide plate. The prism sheet is disposed above the light emitting surface of the light guide plate and includes a plurality of prisms facing the light emitting surface. The reflective structure is disposed under the bottom surface of the light guide plate. The reflective structure has a characteristic of changing its reflectivity according to a control signal applied thereto.

One embodiment of the invention provides a display apparatus including a backlight module and a display panel. The backlight module includes a light guide plate, a light source, a prism sheet and a reflective structure. The light guide plate includes a light emitting surface, a bottom surface opposite to the light emitting surface, a light incident surface connected with the light emitting surface and the bottom surface and a plurality of micro structures located on the bottom surface or the light emitting surface. The light source is disposed beside the light incident surface of the light guide plate. The prism sheet is disposed above the light emitting surface of the light guide plate and includes a plurality of prisms facing the light emitting surface. The reflective structure has a characteristic of changing its reflectivity according to a control signal applied thereto.

Based on the above, the embodiments of the invention achieve at least one of the following advantages or effects. Because the reflective structure of the backlight module of the invention has the characteristic of changing its reflectivity according to the control signal applied thereto, the backlight module can adjust the distribution angle of the light from the light source in the direction perpendicular to the light emitting surface of the light guide plate, such that the display apparatus using the backlight module is provided with a capability of switching the viewing angle to, for example, the wide viewing angle or the narrow viewing angle, for display.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that both the foregoing and other detailed descriptions, features and advantages are intended to be described more comprehensively by providing an embodiment accompanied with figures hereinafter. The language used to describe the directions such as up, down, left, right, front, back or the like in the reference drawings is regarded in an illustrative rather than in a restrictive sense. Thus, the language used to describe the directions is not intended to limit the scope of the invention.

Figure 1:
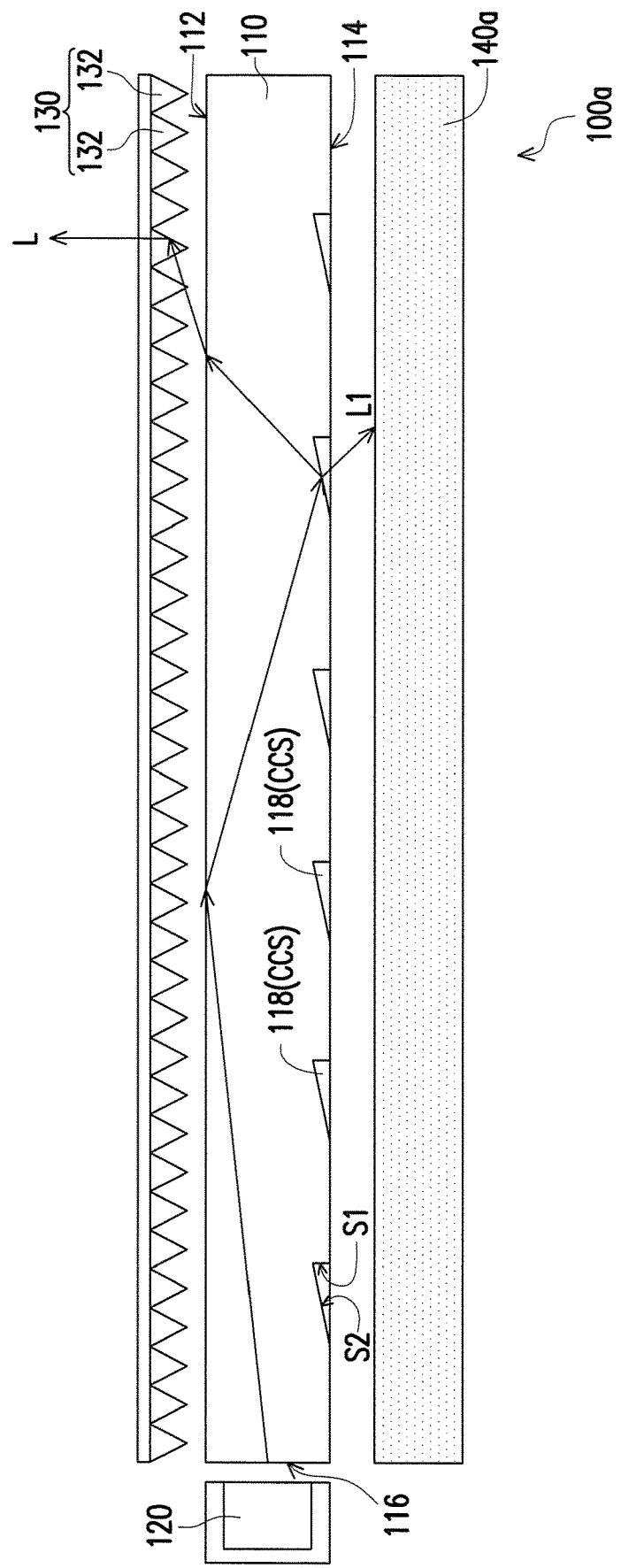
FIG. 1 is a schematic view illustrating a backlight module according to an embodiment of the invention.

FIG. 1 is a schematic view illustrating a backlight module according to an embodiment of the invention. Referring to FIG. 1, in the present embodiment, a backlight module 100a includes a light guide plate 110, a light source 120, a prism sheet 130 and a reflective structure 140a. The light guide plate 110 has a light emitting surface 112, a bottom surface 114 opposite to the light emitting surface 112, a light incident surface 116 connected with the light emitting surface 112 and the bottom surface 114 and a plurality of micro structures 118 located on the bottom surface 114. The light source 120 is disposed beside the light incident surface 116 of the light guide plate 110. The prism sheet 130 is disposed above the light emitting surface 112 of the light guide plate 110. The prism sheet 130 includes a plurality of prisms 132 facing the light emitting surface 112. The reflective structure 140a is disposed under the bottom surface 114 of the light guide plate 110. The reflective structure 140a has a characteristic of changing its reflectivity according to a control signal applied thereto.

To be detailed, in the present embodiment, the light guide plate 110 is a transparent light guide plate, wherein the micro structures 118 of the light guide plate 110 are concave structures CCS (e.g., V-cut structures), each concave structure CCS has a first surface S1 and a second surface S2 that are connected with each other, and each first surface S1 faces the light source 120. The concave structures CCS may be arranged in parallel along a direction or arranged irregularly and dispersively. However, the present embodiment is not limited to the concave structures CCS. In another exemplary embodiment that is not shown, a structure type of the micro structures 118 may also be a convex type, such as a prismatic shape or a wedge shape, as long as light in the light guide plate 110 may be concentrated to emit in a direction having an inclination angle of 70 or 80 degrees with the light emitting surface 112. Although the micro structures 118 are located on the bottom surface 114 of the light guide plate 110 in the present embodiment, the invention is not limited thereto. In another exemplary embodiment that is not shown, the micro structures 118 may also be located on the light emitting surface 112 of the light guide plate 110, and the structure type thereof is not limited to the concave structure or the convex structure. Meanwhile, the light source 120 of the present embodiment includes at least one light emitting diode (LED), e.g., a light emitting strip composed of a plurality of LEDs. The prisms 132 of the prism sheet 130 face the light emitting surface 112 of the light guide plate 110, such that a light beam L emitting from the light emitting surface 112 of the light guide plate 110 is totally reflected and turned toward a 0-degree direction, i.e., a normal-view direction.

Specially, the reflective structure 140a of the present embodiment is, for example, a micro-capsule electrophoretic display sheet, a micro-cup electrophoretic display sheet, a quick response-liquid powder display (QR-LPD) sheet or an in-plane electrophoretic display (IP-EPD) sheet. A display state of the aforementioned display sheet serving as the reflective structure 140a may be changed as, for example, a full-black screen, a full-white screen, a partially full-black and partially full-white state or having different gray scales, through an electrical signal applied from the external. As the display state presented by the reflective structure 140a differs, the reflectivity of the reflective structure 140a toward the incident light also differs. Namely, the reflective structure 140a has a characteristic of changing its reflectivity according to a control signal applied thereto. In brief, the reflective structure 140a of the present embodiment has a characteristic of having an adjustable reflectivity. Referring to FIG. 1, when the reflective structure 140a of the present embodiment is in a low-reflectivity mode according to a control signal applied thereto, wherein a light beam L1 from the light source 120 passing through the light incident surface 116 enters the light guide plate 110, and the light beam L1 transmitted in the light guide plate 110 is refracted to the reflective structure 140a by the micro structures 118, the reflective structure 140a absorbs the light beam L1 refracted by the micro structures 118 to reduce the light beam L1 refracted back to the light guide plate 110 scattered toward a normal viewing angle direction by the micro structures 118 on the light guide plate 110 and further refracted toward a large viewing angle direction by the prism sheet 130, so as to avoid increasing a light intensity of a light leakage in the large viewing angle. In this case, a light intensity of the light beam L emitting from the prism sheet 130 in a light-emitting angle greater than ±30 degrees is less than 5% of a light intensity thereof in a light-emitting angle of 0 degree in a direction perpendicular to the light emitting surface 112 of the light guide plate 110. In other words, when the reflective structure 140a is in the low-reflectivity mode, the light intensity of the light provided by the backlight module 100a is concentrative distributed within a narrow angle range. Namely, the backlight module 100a may be considered as a backlight module in an anti-peep mode.

It should be mentioned that in the embodiment described below, element labels and part of the contents related to the previous embodiments are referenced hereafter, and the same or similar elements are represented by the same or similar reference labels. Descriptions related to the same technique contents may refer to the previous embodiments and will not be repeated hereinafter.

Figure 2:
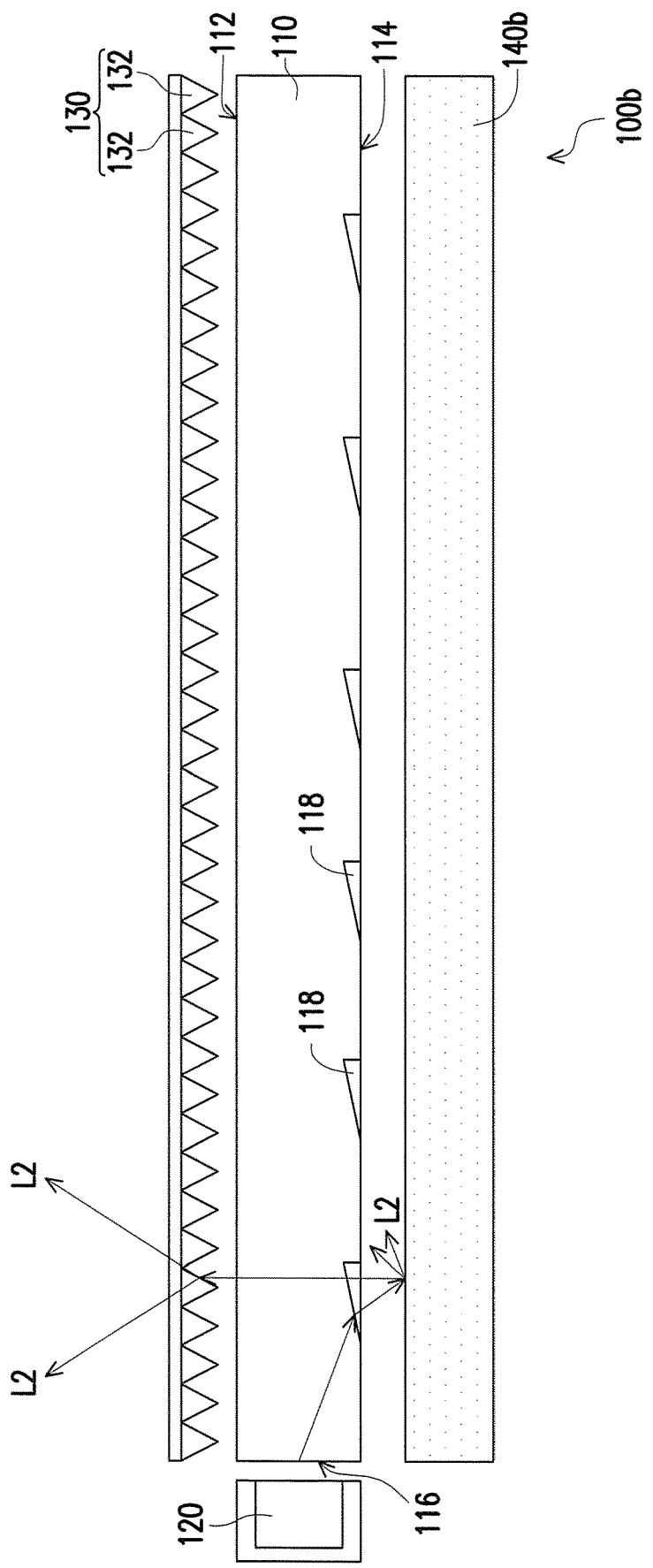
FIG. 2 is a schematic view illustrating a backlight module according to another embodiment of the invention.

In another embodiment, referring to FIG. 2, a backlight module 100b of the present embodiment is similar to the backlight module 100a illustrated in FIG. 1, and the difference therebetween is as follows. When a reflective structure 140b of the present embodiment is in a high-reflectivity mode according to a control signal applied thereto, wherein a light beam L2 from the light source 120 passing through the light incident surface 116 enters the light guide plate 110, and the light beam L2 transmitted in the light guide plate 110 is refracted to the reflective structure 140b by the micro structures 118, the reflective structure 140b scatters the light beam L2 refracted by the micro structures 118 and pass through the light guide plate 110 to the prism sheet 130, and a part of the light beam L2 biased to the normal viewing angle is refracted toward the large viewing angle direction by the prism sheet 130. In this case, the light intensity of the light beam from the prism sheet 130 in the light-emitting angle greater than ±30 degrees is greater than 5% of the light intensity thereof in the light-emitting angle of 0 degree in a direction perpendicular to the light emitting surface 112 of the light guide plate 110. In other words, when the reflective structure 140b is in the high-reflectivity mode, the light provided by the backlight module 100b is widely distributed. Namely, the backlight module 100b may be considered as a backlight module in a wide viewing angle mode.

Figure 3:
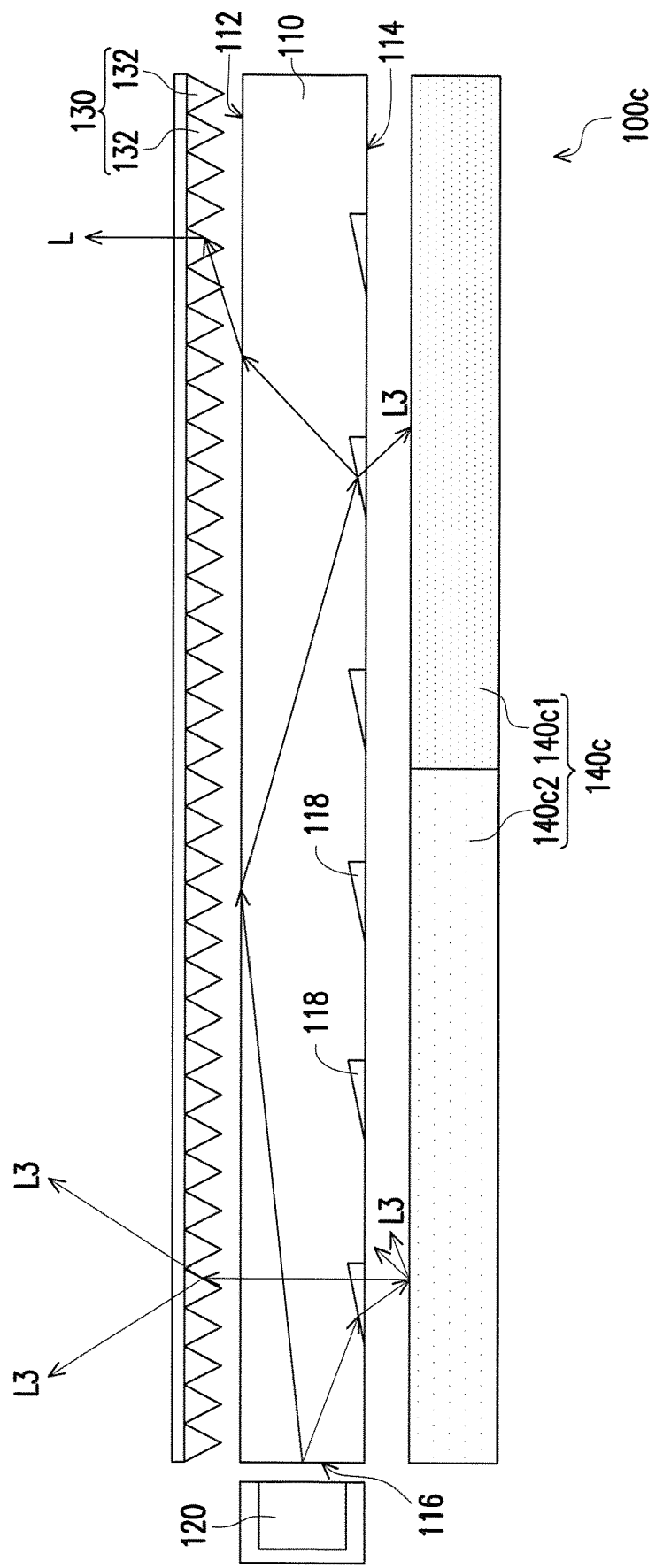
FIG. 3 is a schematic view illustrating a backlight module according to another embodiment of the invention.

In yet another embodiment, referring to FIG. 3, a backlight module 100c of the present embodiment is similar to the backlight module 100a illustrated in FIG. 1, and the difference therebetween is as follows. When a reflective structure 140c of the present embodiment is in a partial low-reflectivity and partial high-reflectivity mode according to a control signal applied thereto, wherein a light beam L3 from the light source 120 passing through the light incident surface 116 enters the light guide plate 110, and the light beam L3 transmitted in the light guide plate 110 is refracted to the reflective structure 140c by the micro structures 118, a part 140c1 of the reflective structure 140c absorbs the light beam L3 refracted by the micro structures 118, and the other part 140c2 of the reflective structure 140c scatters the light beam L3 refracted by the micro structures 118 to the prism sheet 130. In other words, when the reflective structure 140c is in the partial low-reflectivity and partial high-reflectivity mode, a part of the light provided by the backlight module 110c is narrowly distributed, while the other part is widely distributed. Namely, the backlight module 100c may be considered as simultaneously having the anti-peep mode and the wide viewing angle mode.

In brief, the reflective structure of the invention may be embodied as the reflective structure 140a having the low-reflectivity mode, the reflective structure 140b having the high-reflectivity mode or the reflective structure 140c having the partial low-reflectivity and partial high-reflectivity mode. Namely, the reflective structure has three modes, i.e., the low-reflectivity mode, the high-reflectivity mode and the partial low-reflectivity and partial high-reflectivity mode. Thus, the backlight modules 100a, 100b and 100c of the embodiments of the invention may be capable of adjusting the light distribution angle in the direction perpendicular to the light emitting surface 112 of the light guide plate 110 and thereby, achieve to have the anti-peep mode, the wide viewing angle mode or both the anti-peep mode and the wide viewing angle mode.

Figure 4:
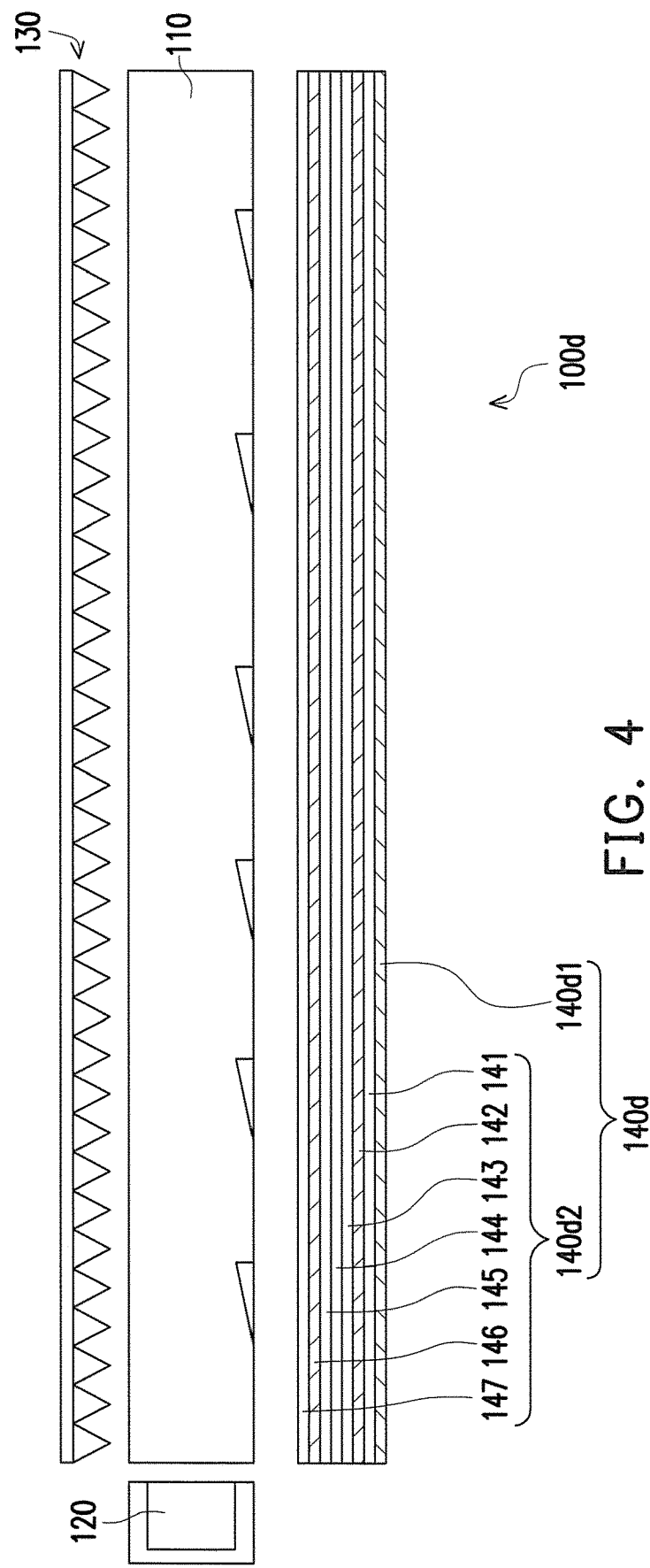
FIG. 4 is a schematic view illustrating a backlight module according to another embodiment of the invention.

Additionally, the structure type of the reflective structure is not limited in the invention. In still another embodiment, referring to FIG. 4, a backlight module 100d of the present embodiment is similar to the backlight module 100a illustrated in FIG. 1, and the difference therebetween is as follows. A reflective structure 140d of the present embodiment includes a diffusion reflector 140d1 and an electrochromic plate 140d2. The electrochromic plate 140d2 is disposed between the light guide plate 110 and the diffusion reflector 140d1. In detail, the electrochromic plate 140d2 of the present embodiment includes a first transparent substrate 141, a first transparent conductive layer 142, an ion storage layer 143, an electrolyte layer 144, an electrochromic material layer 145, a second transparent conductive layer 146 and a second transparent substrate 147 which are sequentially stacked. The first transparent substrate 147 is disposed on the diffusion reflector 140d1. The diffusion reflector 140d1 may have a rough surface. Alternatively, the diffusion reflector 140d1 may contain blisters or diffusion particles. The diffusion reflector 140d1 may be disposed on the first transparent substrate 141 through an optical adhesive layer or a pressure sensitive adhesive. Alternatively, the diffusion reflector 140d1 may also be directly formed on the first transparent substrate 141 by means of coating.

When the first transparent conductive layer 142 and the second transparent conductive layer 146 of the electrochromic plate of the present embodiment are electrically conducted on, the electrochromic plate 140d2 presents a black opaque state. In this circumstance, the light refracted to the electrochromic plate 140d2 by the micro structures 118 on the bottom of the light guide plate 110 is absorbed by the electrochromic plate 140d2, and thus, the overall reflective structure 140d is in a low-reflectivity mode. Namely, the backlight module 100d may be considered as a backlight module in the anti-peep mode. When the first transparent conductive layer 142 and the second transparent conductive layer 146 of the electrochromic plate 140d2 are not electrically conducted on, the electrochromatic plate 140d2 presents a light-transmissive state. In this circumstance, the light refracted to the electrochromic plate 140d2 by the micro structures 118 on the bottom of the light guide plate 110 passes through the electrochromic plate 140d2 to the diffusion reflector 140d1, and the light is scattered to the normal viewing angle direction due to the diffusion structure design (e.g., the rough surface, the blisters or the diffusion particles) of the diffusion reflector 140d1 and further refracted to the large viewing angle direction by the prism sheet 130, such that the light intensity in the large viewing angle is increased. Thus, the overall reflective structure 140d is in a high-reflectivity mode. Namely, the backlight module 100d may be considered as a backlight module in the wide viewing angle mode.

Figure 5:
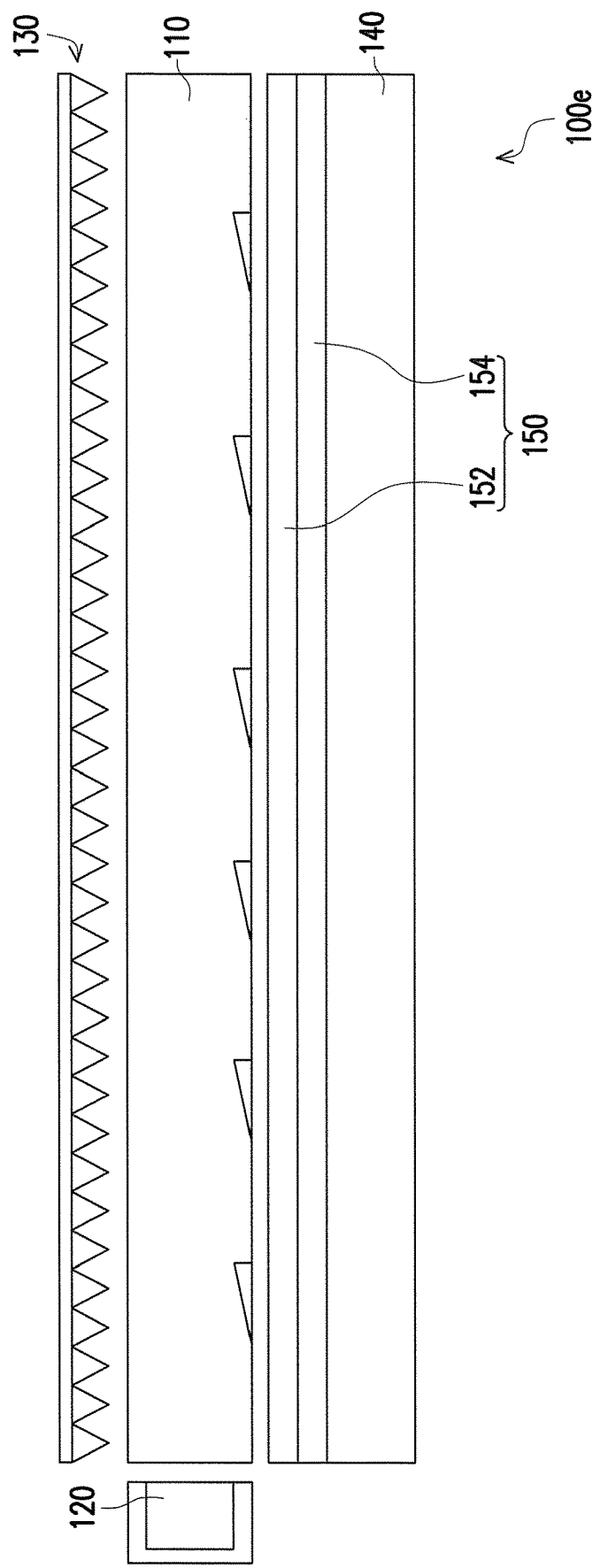
FIG. 5 is a schematic view illustrating a backlight module according to another embodiment of the invention.

FIG. 5 is a schematic view illustrating a backlight module according to another embodiment of the invention. Referring to FIG. 5, a backlight module 100e of the present embodiment is similar to the backlight module 100a illustrated in FIG. 1, and the difference therebetween is as follows. The backlight module 100e of the present embodiment further includes an optical film 150 disposed between the reflective structure 140 and the light guide plate 110. The optical film 150 includes an anti-reflective film (AR) film 152 and an anti-glare (AG) film 154. The AG film 154 is located between the AR film 152 and the reflective structure 140. In this case, the optical film 150 may be disposed above the reflective structure 140 by means of additional installation. Alternatively, the optical film 150 may be directly formed on the reflective structure 140 by means of coating. The AR film 152, the AG film 154 and the reflective structure 140 are preferably stacked without any air gaps between each stacked layers, and thus, a transparent adhesive (not shown) may be filled between each stacked layers to eliminate interface reflection.

When the reflective structure 140 illustrated in FIG. 1 is adjusted as the reflective structure 140a in the low-reflectivity mode, the backlight module 100e of the present embodiment may further reduce the overall reflectivity through the optical film 150. When the reflective structure 140 illustrated in FIG. 2 is adjusted as the reflective structure 140b in the high-reflectivity mode, the backlight module 100e of the present embodiment may increase the light intensity scattered to the large angle direction through the optical film 150. In addition, it is to be mentioned that in another exemplary embodiment that is not shown, the optical film may also include an AR film, an AG film, a low-reflectivity (LR) film or a combination of the films, which is not limited in the present invention.

Figure 6:
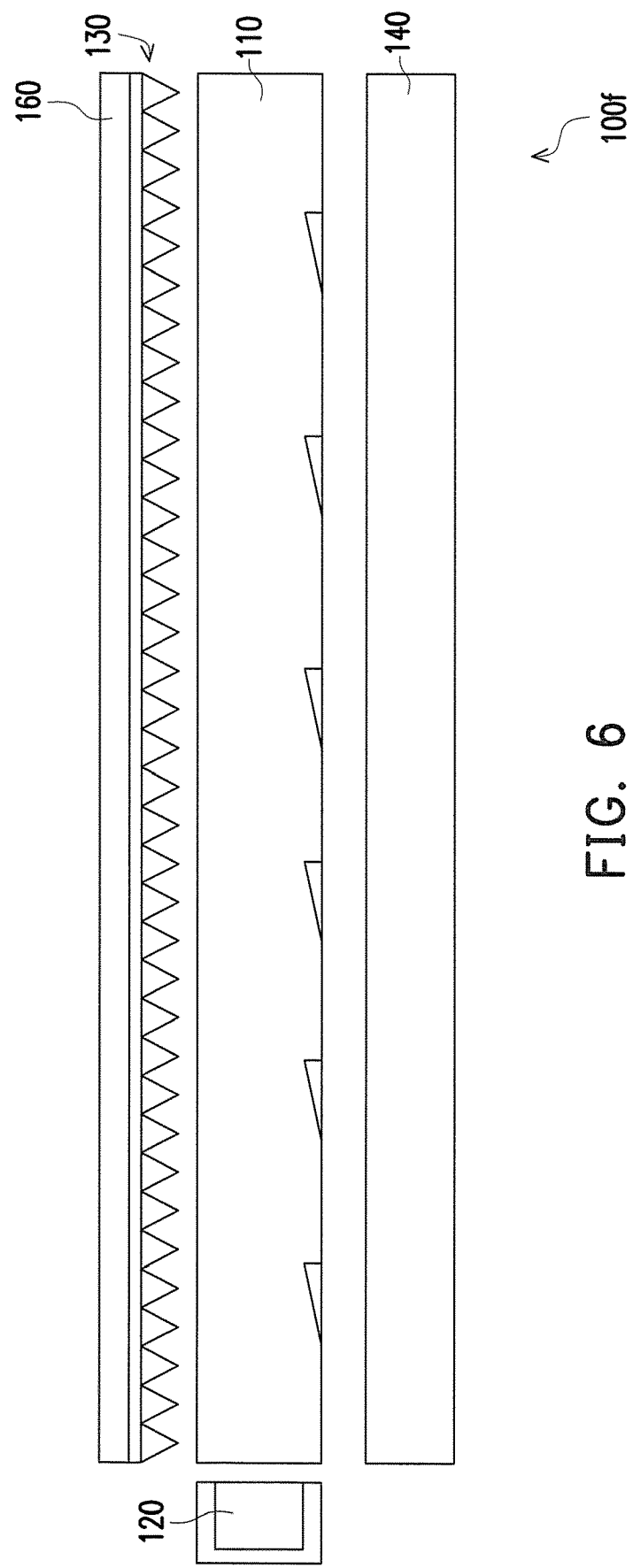
FIG. 6 is a schematic view illustrating a backlight module according to another embodiment of the invention.

FIG. 6 is a schematic view illustrating a backlight module according to another embodiment of the invention. Referring to FIG. 6, a backlight module 100f of the present embodiment is similar to the backlight module 100a illustrated in FIG. 1, and the difference therebetween is as follows. The backlight module 100f of the present embodiment further includes an optical film 160 disposed on a side of the prism sheet 130 which is relatively far away from the light emitting surface 112 of the light guide plate 110. The optical film 160 includes an AR film, a LR film or a combination of the films. In this case, the optical film 160 may be adhered to the prism sheet 130 by means of additional installation to reduce the reflectivity of the prism sheet 130, such that the phenomenon of light leakage of the backlight module 100f in the large viewing angle in the anti-peep mode may be mitigated. In this case, the optical film 160 and the prism sheet 130 preferably have no air gap therebetween, and thus, a transparent adhesive (not shown) may be filled between the stacked layers to eliminate interface reflection.

Figure 7:
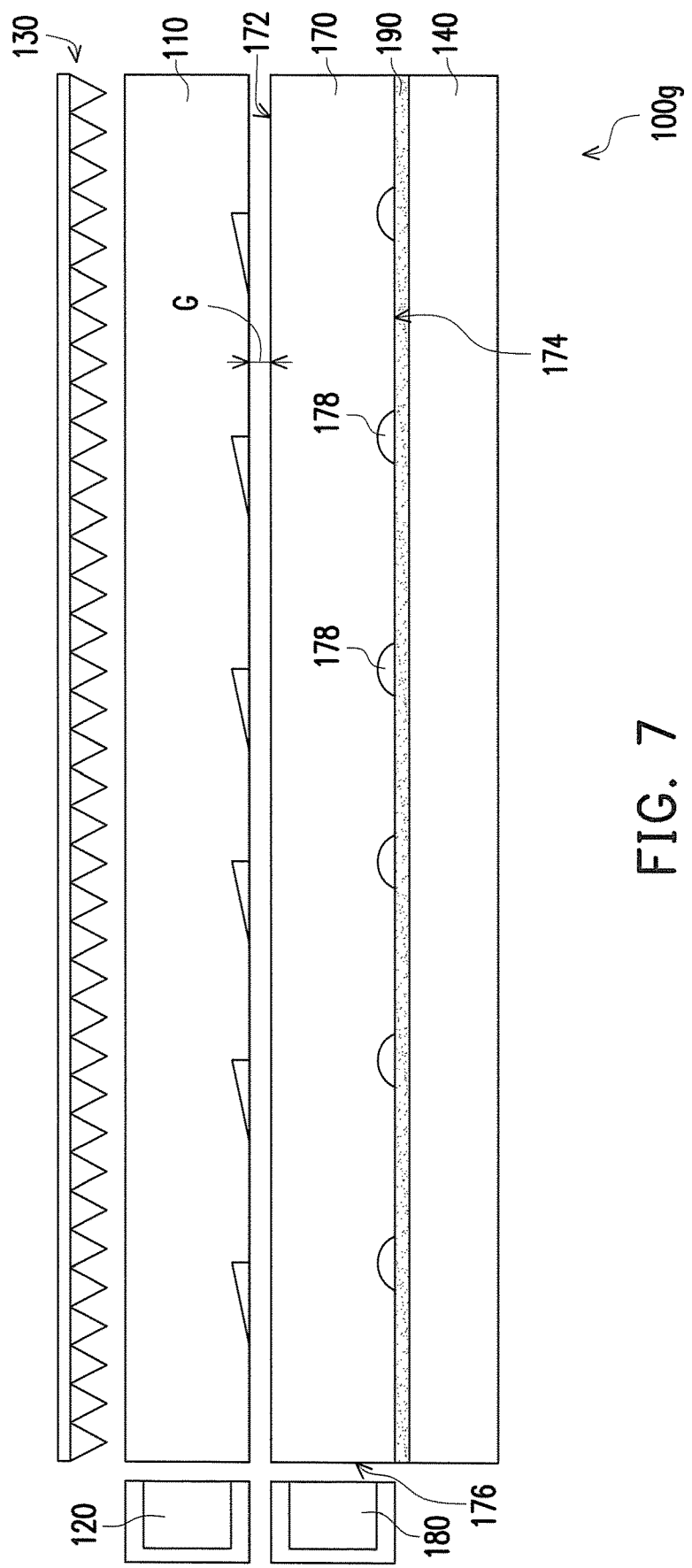
FIG. 7 is a schematic view illustrating a backlight module according to another embodiment of the invention.

FIG. 7 is a schematic view illustrating a backlight module according to another embodiment of the invention. Referring to FIG. 7, a backlight module 100g of the present embodiment is similar to the backlight module 100a illustrated in FIG. 1, and the difference therebetween is as follows. The backlight module 100g of the present embodiment further includes an auxiliary light guide plate 170 and auxiliary light source 180. The auxiliary light guide plate 170 is disposed between the light guide plate 110 and the reflective structure 140. The auxiliary light guide plate 170 has an auxiliary light emitting surface 172, an auxiliary bottom surface 174 opposite to the auxiliary light emitting surface 172, an auxiliary light incident surface 176 connected with the auxiliary light emitting surface 172 and the auxiliary bottom surface 174 and a plurality of scattering micro structures 178 located on the auxiliary bottom surface 174. The auxiliary light source 180 is disposed beside the auxiliary light incident surface 176 of the auxiliary light guide plate 176. The auxiliary light source 180 is, for example, a light emitting strip composed of a plurality of LEDs. In this case, the auxiliary light guide plate 170 and the reflective structure 140 are bonded through an optical adhesive 190, and the auxiliary light guide plate 170 and the light guide plate 110 have a gap G therebetween.

In the present embodiment, when the light source 120 is lit, and the auxiliary light source 180 is not, the light provided by the backlight module 100g is narrowly distributed. Namely, the backlight module 100g may be considered as a backlight module in the anti-peep mode. When at least the auxiliary light source 180 is lit (e.g., only the auxiliary light source 180 is lit, or both the light source 120 and the auxiliary light source 180 are lit), the light provided by the backlight module 100g is widely distributed. Namely, the backlight module 100g may be considered as a backlight module in the wide viewing angle mode. It is to be mentioned that the purpose of additionally disposing the auxiliary light guide plate 170 under the light guide plate 110 lies in that the auxiliary light guide plate 170 including the scattering micro structures 178 facilitates projecting the light beam generated by the auxiliary light source 180 toward the normal-view angle direction, and thereby, the light is refracted to the large viewing angle direction by the prism sheet 130, so as to increase the light intensity of the backlight module 100g in the large viewing angle direction in the wide viewing angle mode. In addition, bonding the reflective structure 140 with the auxiliary light guide plate 170 through the optical adhesive 190 may facilitate effectively reducing the light intensity reflected to the micro structures 178 on the bottom of the auxiliary light guide plate 170 when interface reflection occurs, such that the light intensity scattered by the micro structures 178 and refracted to the large viewing angle by the prism sheet 130 may be reduced. Thereby, the light leakage of the backlight module 100g in the large viewing angle direction in the anti-peep mode may be mitigated.

Figure 8:
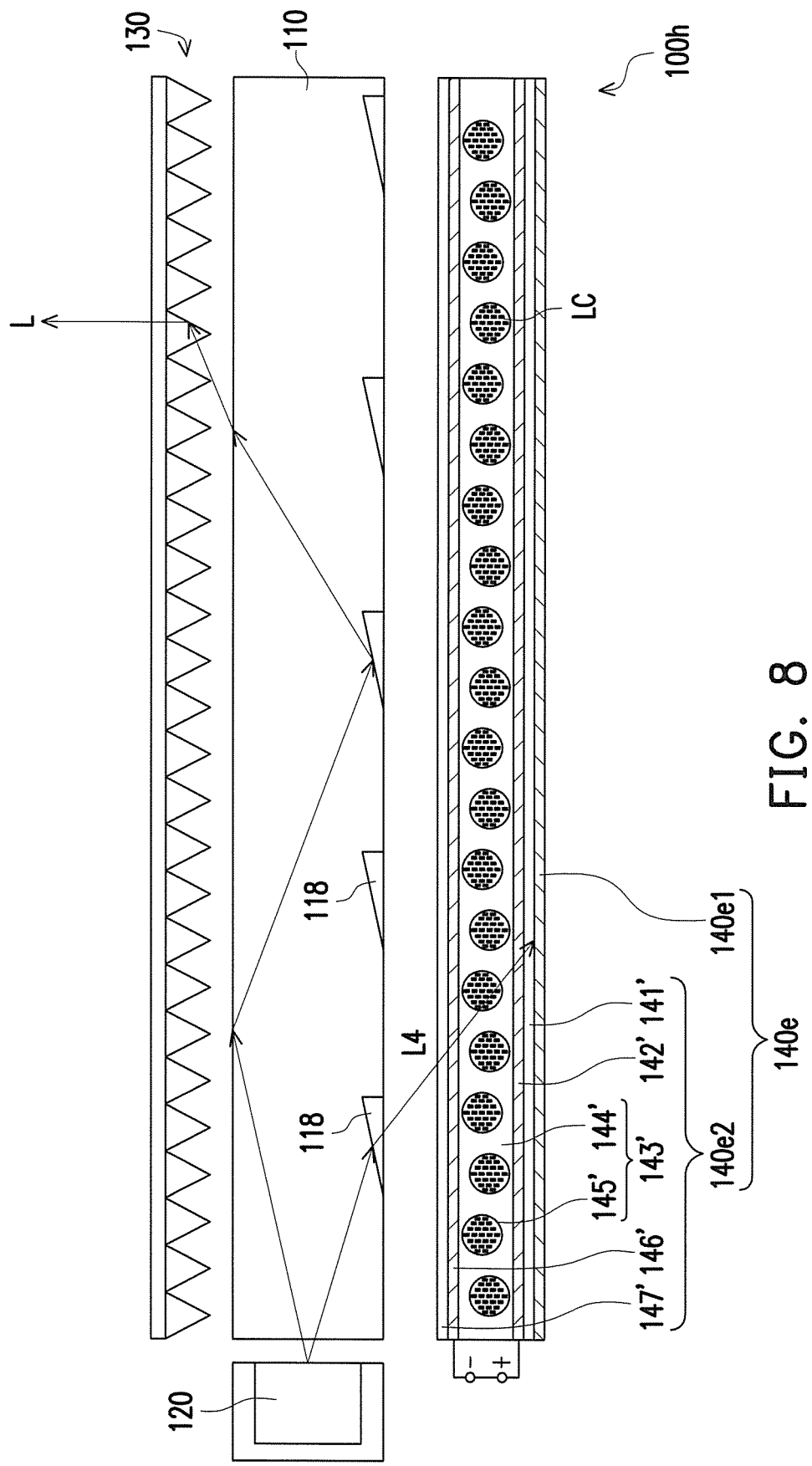
FIG. 8 is a schematic view illustrating a backlight module according to another embodiment of the invention.

FIG. 8 is a schematic view illustrating a backlight module according to another embodiment of the invention. Referring to FIG. 8, a backlight module 100h of the present embodiment is similar to the backlight module 100a illustrated in FIG. 1, and the difference therebetween is as follows. A reflective structure 140e of the present embodiment includes a light absorption layer 140e1 and a polymer-dispersed liquid crystal plate 140e2. The polymer-dispersed liquid crystal plate 140e2 is disposed between the light guide plate 110 and the light absorption layer 140e1. To be detailed, the polymer-dispersed liquid crystal plate 140e2 of the present embodiment includes a first transparent substrate 141', a first transparent conductive layer 142', a polymer-dispersed liquid crystal layer 143', a second transparent conductive layer 146' and a second transparent substrate 147' which are sequentially stacked. The first transparent substrate 141' is disposed on the light absorption layer 140e1. The polymer-dispersed liquid crystal layer 143' includes a polymer layer 144' and a plurality of liquid crystal micelles 145'. The liquid crystal micelles 145' are dispersed in the polymer layer 144'.

When the first transparent conductive layer 142' and the second transparent conductive layer 146' of the polymer-dispersed liquid crystal plate 104e2 of the present embodiment are electrically conducted on, liquid crystal LC of the liquid crystal micelles 145' in the polymer-dispersed liquid crystal layer 143' presents in a regular arrangement, such that the polymer-dispersed liquid crystal plate 140e2 is in a transparent state. In this circumstance, a light L4 refracted to the polymer-dispersed liquid crystal plate 140e2 by the micro structures 118 on the bottom of the light guide plate 110 directly passes through the polymer-dispersed liquid crystal layer 143' and is absorbed by the light absorption layer 140e1. Thus, the overall reflective structure 140e is in a low-reflectivity mode. Namely, the backlight module 100h may be considered as a backlight module in the anti-peep mode.

Figure 9:
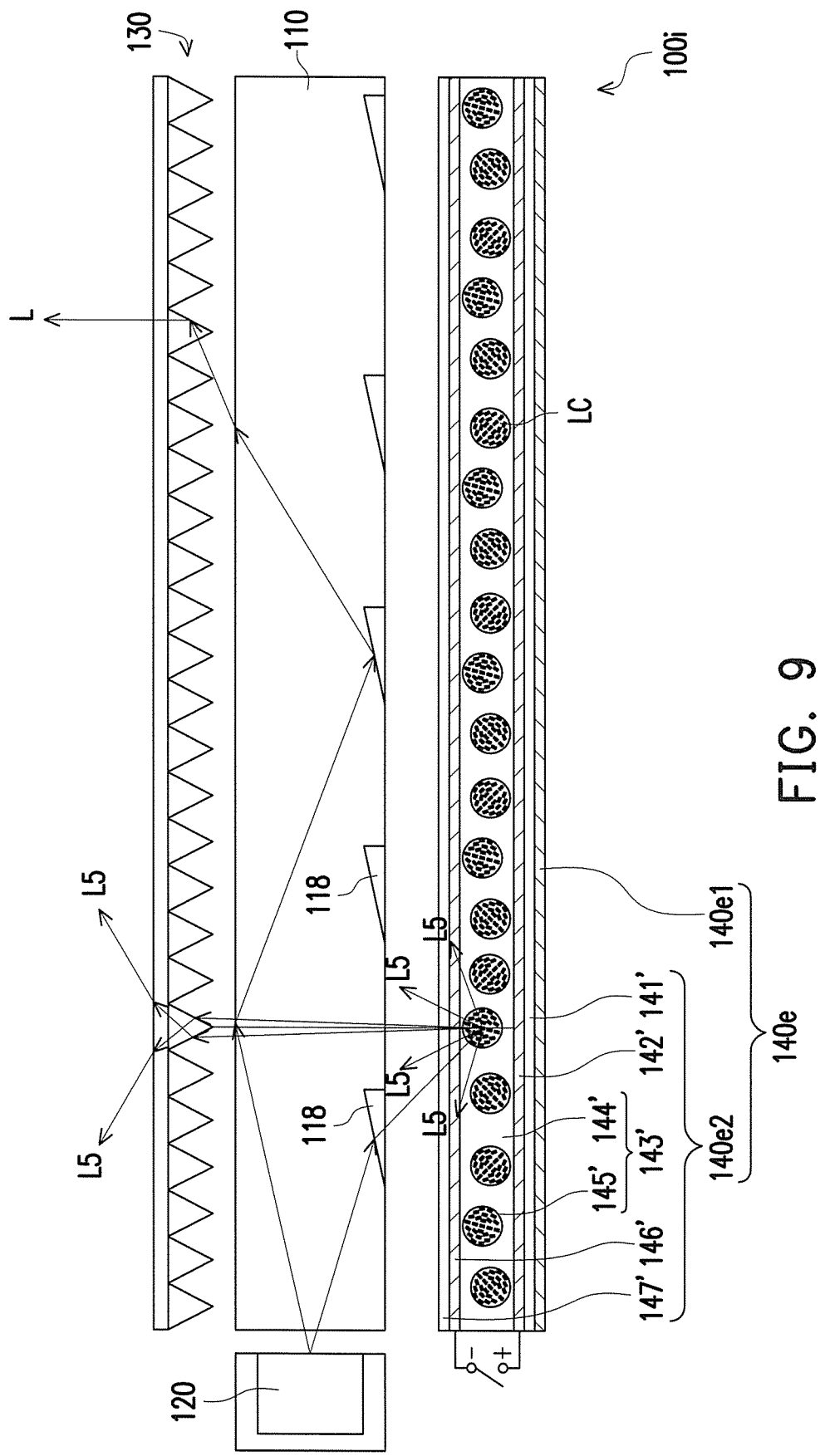
FIG. 9 is a schematic view illustrating a backlight module according to another embodiment of the invention.

FIG. 9 is a schematic view illustrating a backlight module according to another embodiment of the invention. Referring to FIG. 9, a backlight module 100i of the present embodiment is similar to the backlight module 100h illustrated in FIG. 8, and the difference therebetween is as follows. When a reflective structure 140e of the present embodiment induces the first conductive layer 142' and the second conductive layer 146' of the polymer-dispersed liquid crystal plate 140e2 not to be electrically conducted on according to a control signal applied thereto, the liquid crystal LC of the liquid crystal micelles 145' in the polymer-dispersed liquid crystal layer 143' presents in irregularly arranged, such that the polymer-dispersed liquid crystal plate 140e2 presents a white mist state. In this circumstance, a light L5 refracted to the polymer-dispersed liquid crystal plate 140e2 by the micro structures 118 on the bottom of the light guide plate 110 is scattered by the irregularly arranged liquid crystal LC in the liquid crystal micelles 145' and refracted to the large viewing angle direction by the prism sheet 130, such that the light intensity in the large viewing angle is increased. Thus, the overall reflective structure 140e presents a low-reflectivity mode. Namely, the backlight module 100i may be considered as a backlight module in the wide viewing angle mode.

Figure 10:
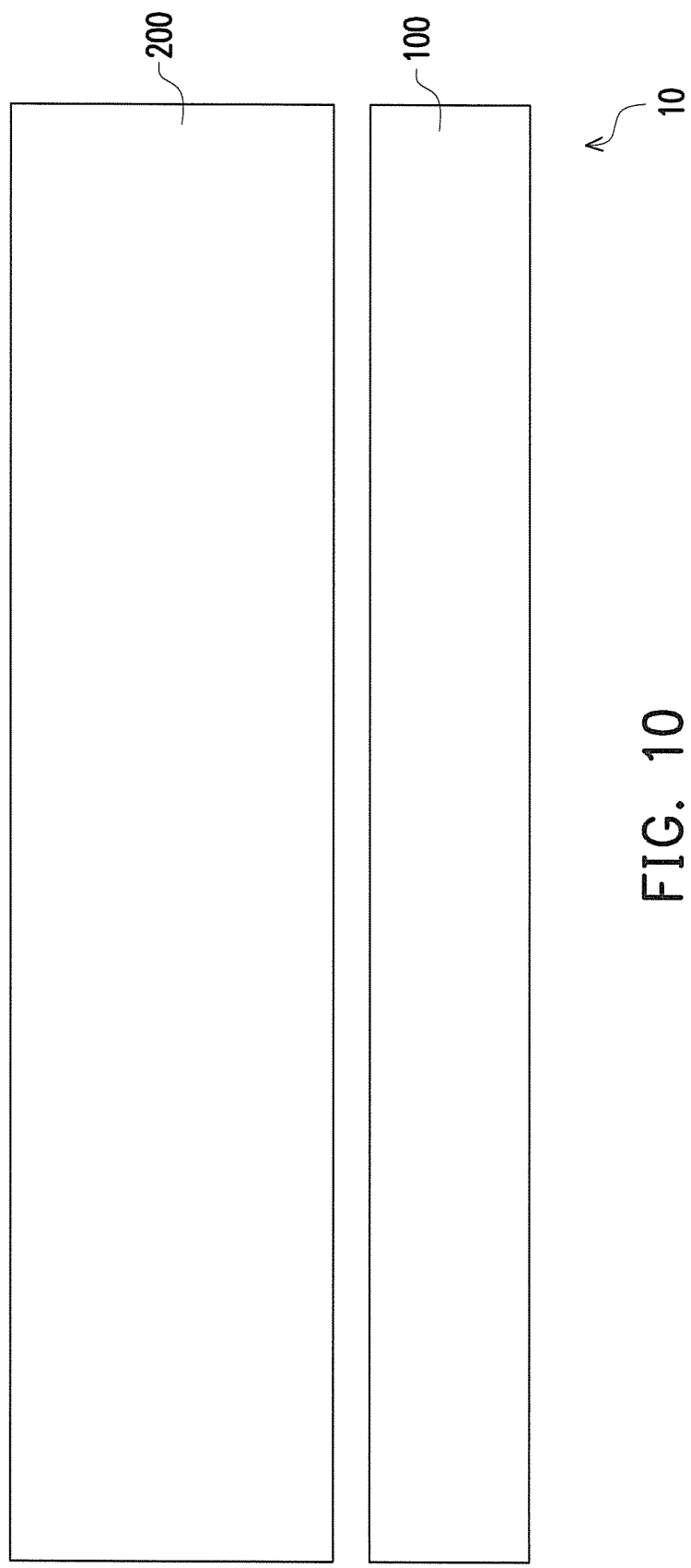
FIG. 10 is a schematic view illustrating a display apparatus according to an embodiment of the invention.

FIG. 10 is a schematic view illustrating a display apparatus according to an embodiment of the invention. A display apparatus 10 of the present embodiment includes a backlight module 100 and a display panel 200. The backlight module 100 may be, for example, any one of the backlight modules 100a, 100b, 100c, 100d, 100e, 100f, 100g, 100h, and 100i of the embodiments described above, and the display panel 200 is, for example, a liquid crystal display (LCD) panel, an electro-wetting display, a micro-shutter display or other non-self illuminating display panels, which is not limited in the present invention. The backlight module 100 of the present embodiment has the reflective structure 140 with an adjustable reflectivity, and may be the reflective structure 140a, 140b, 140c, 140d or 140e, for example. Thus, the backlight module 100 has a characteristic of an adjustable light distribution angle, and the display apparatus 10 using the backlight module 100 may be benefited from having an adjustable viewing angle (e.g., a narrow viewing angle, a wide viewing angle or both a narrow and a wide viewing angles). To be more specific, when the reflective structure 140 is in the low-reflectivity mode, a light intensity of the light beam emitting from the display panel 200 in a light-emitting angle greater than ±30 degrees is less than 5% of a light intensity thereof in a light-emitting angle of 0 degree in a direction perpendicular to the light emitting surface 112 of the light guide plate 110, and the display apparatus 10 displays in a narrow viewing angle. When the reflective structure 140 is in the high-reflectivity mode, the light intensity of the light beam emitting from the display panel 200 in the light-emitting angle greater than ±30 degrees is greater than 5% of the light intensity thereof in the light-emitting angle of 0 degree in the direction perpendicular to the light emitting surface 112 of the light guide plate 110, and the display apparatus 10 displays in a wide viewing angle.

Figure 11:
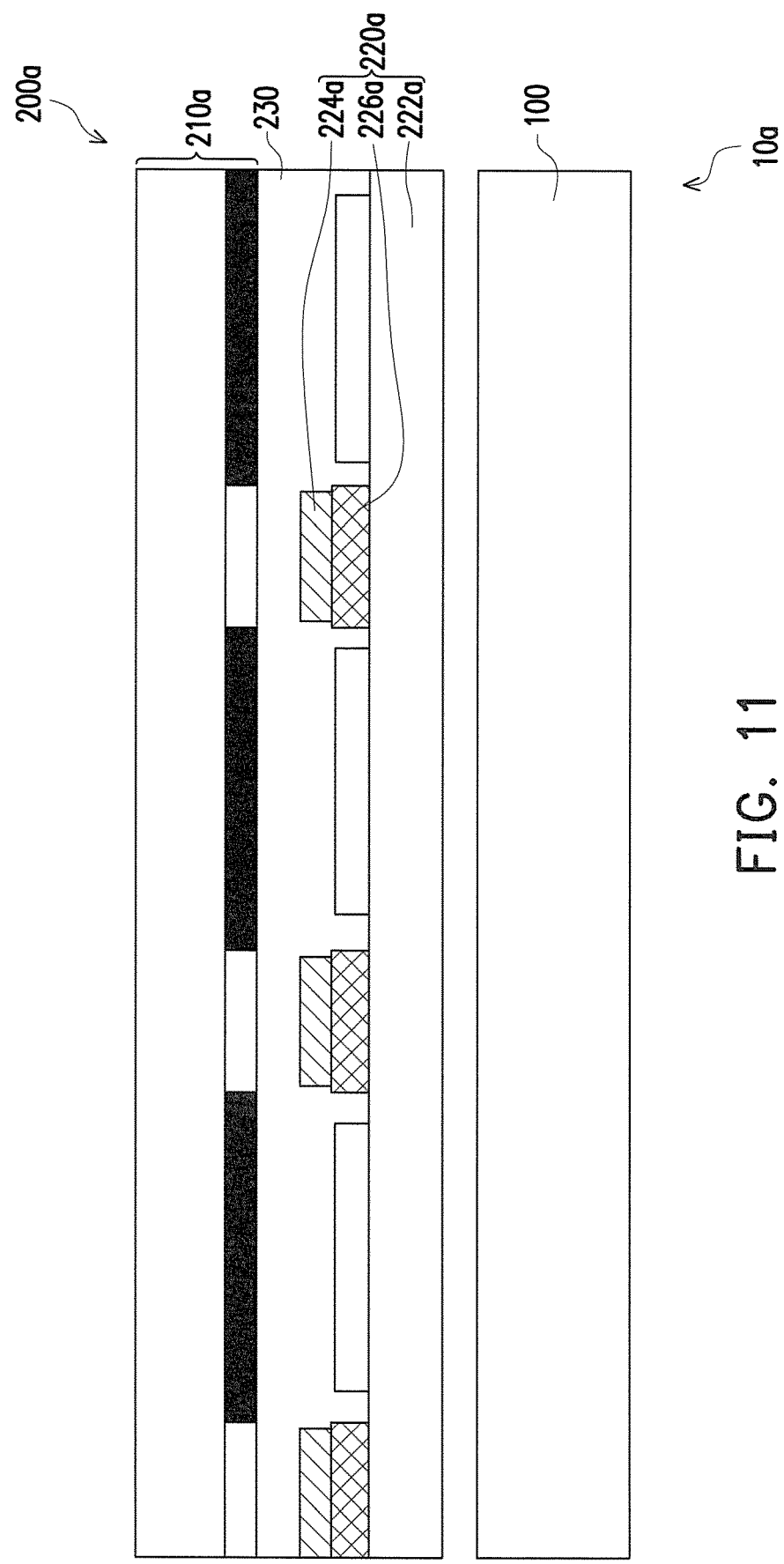
FIG. 11 is a schematic view illustrating a display apparatus according to another embodiment of the invention.

FIG. 11 is a schematic view illustrating a display apparatus according to another embodiment of the invention. Referring to FIG. 11, the display apparatus 10a of the present embodiment is similar to the display apparatus 10 illustrated in FIG. 10, and the difference therebetween is as follows. A display panel 200a of the display apparatus 10a of the present embodiment includes a color filter substrate 210a, a thin film transistor (TFT) array substrate 220a and a display medium layer 230. The TFT array substrate 220a includes a substrate 222a, a patterned metal circuit layer 224a and a light-absorption pattern layer 226a. The substrate 222a is disposed between the backlight module 100 and the color filter substrate 210a. The patterned metal circuit layer 224a is disposed on the substrate 222a. The light-absorption pattern layer 226a is disposed between the substrate 222a and the patterned metal circuit layer 224a. The display medium layer 230 is disposed between the TFT array substrate 220a and the color filter substrate 210a. The display medium layer 230 is, for example, a liquid crystal layer. Referring to FIG. 11, an orthogonal projection of the light-absorption layer 226a on the substrate 222a overlaps an orthogonal projection of the patterned metal circuit layer 224a on the substrate 222a. In the present embodiment, the orthogonal projection of the light-absorption pattern layer 226a on the substrate 222a is greater than or equal to the orthogonal projection of the patterned metal circuit layer 224a on the substrate 222a, which aims at preventing a scattering phenomenon caused by the light from the backlight module 100 which is directly incident to the patterned metal circuit layer 224a and then reflected to the backlight module since the scattered light may be refracted to the large viewing angle by the prism sheet (not shown) and result in the light leakage phenomenon in the large viewing angle. However, the invention is not limited thereto. In another embodiment, an orthogonal projection of a light-absorption pattern layer 226a on the substrate 222a may also be slightly smaller than the orthogonal projection of the patterned metal circuit layer 224a on the substrate 222a. Thus, by the design of the orthographic projection of the light-absorption pattern layer 226a on the substrate 222a overlapping the patterned metal circuit layer 224a on the substrate 222a, stray light caused by reflection may be reduced, such that the display apparatus 10a may have a preferable anti-peep effect.

Figure 12:
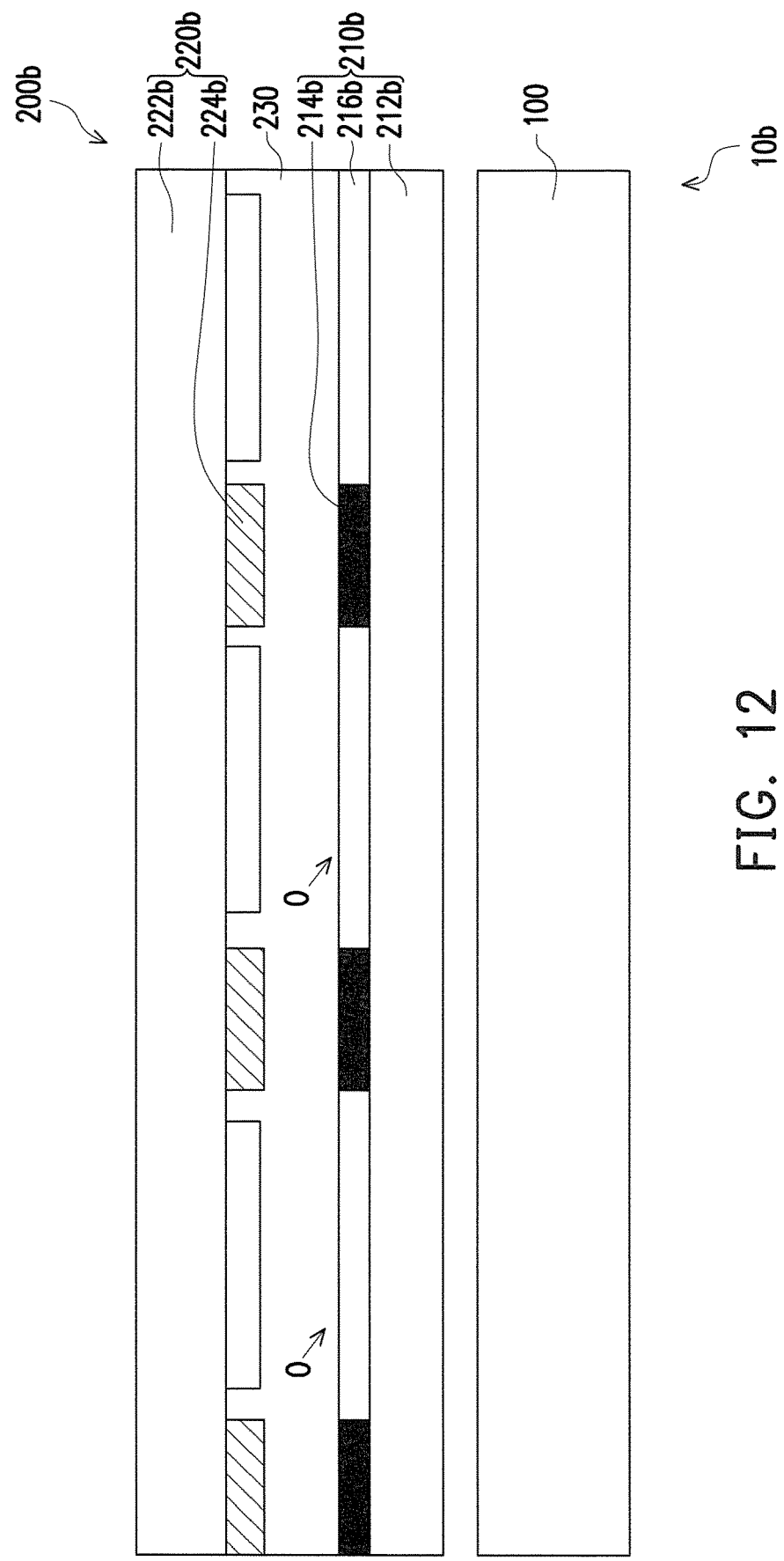
FIG. 12 is a schematic view illustrating a display apparatus according to another embodiment of the invention.

FIG. 12 is a schematic view illustrating a display apparatus according to another embodiment of the invention. Referring to FIG. 12, a display apparatus 10b of the present embodiment is similar to the display apparatus 10 illustrated in FIG. 10, and the difference therebetween is as follows. A display panel 200b of the display apparatus 10b of the present embodiment includes a color filter substrate 210b, a TFT array substrate 220b and a display medium layer 230. The TFT array substrate 220b includes a substrate 222b and a patterned metal circuit layer 224b. The patterned metal circuit layer 224b is disposed on the substrate 222b. The color filter substrate 210b is disposed between the backlight module 100 and the TFT array substrate 220b and includes an opposite substrate 212b, a light-shielding pattern layer 214b and a plurality of color filter patterns 216b. The light-shielding pattern layer 214b is disposed on the opposite substrate 212b and has a plurality of openings O. The color filter patterns 216b are disposed on the opposite substrate 212b and located in the openings O of the light-shielding pattern layer 214b. An orthogonal projection of the light-shielding pattern layer 214b on the substrate 222b overlaps an orthogonal projection of the patterned metal circuit layer 224b on the substrate 222b. The display medium layer 230 is disposed between the TFT array substrate 220b and the color filter substrate 210b. The display medium layer 230 is a liquid crystal layer, for example.

Due to the color filter substrate 210b of the display apparatus 10b of the present embodiment being located between the backlight module 100 and the TFT array substrate 220b, and the orthogonal projection of the light-shielding pattern layer 214b on the substrate 222b overlapping the orthogonal projection of the patterned metal circuit layer 224b on the substrate 222b, in the present embodiment, the orthogonal projection of the light-shielding pattern layer 214b on the substrate 222b is greater than or equal to the orthogonal projection of the patterned metal circuit layer 224b on the substrate 222b. Thereby, a scattering phenomenon caused by the light from the backlight module 100 which is directly incident to the patterned metal circuit layer 224b and then reflected back to the backlight module may be prevented. However, the invention is not limited thereto. In another embodiment, the orthogonal projection of the light-shielding pattern layer 214b on the substrate 222b may also be slightly smaller than the orthogonal projection of the patterned metal circuit layer 224b on the substrate 222b.

Since the scattered light may be refracted to the large viewing angle by the prism sheet 130 and result in the light leakage phenomenon in the large viewing angle, the stray light caused by the light reflected back to the backlight module 100 may be reduced by the design of the orthographic projection of the light-shielding pattern layer 214b on the substrate 222a overlapping the patterned metal circuit layer 224b on the substrate 222a, such that the display apparatus 10b has a better anti-peep effect.

Figure 13:
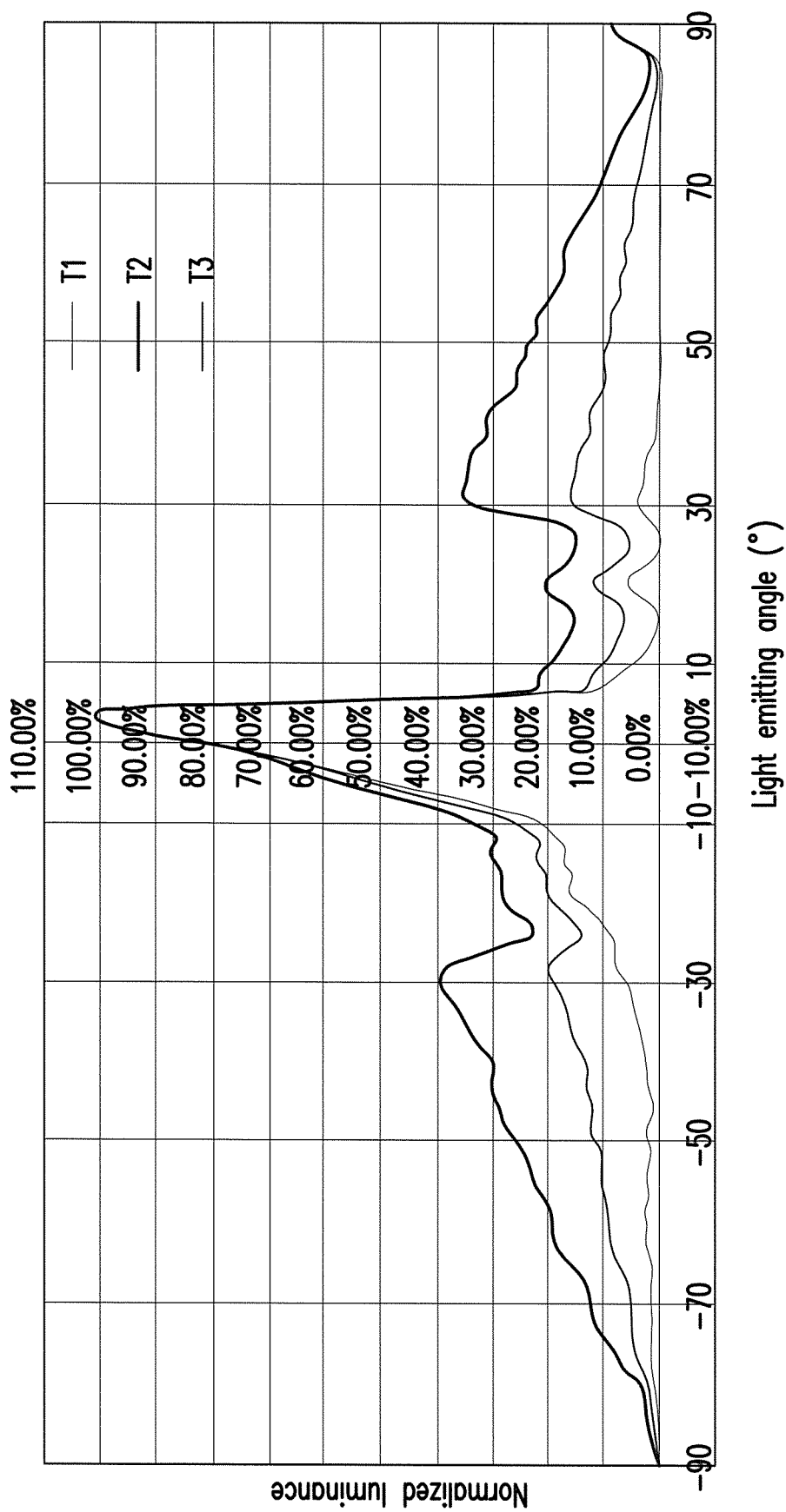
FIG. 13 is a schematic graph illustrating normalized luminance and light emitting angles of a display apparatus in different viewing angles.

FIG. 13 is a schematic graph illustrating normalized luminance and light emitting angles of a display apparatus in different viewing angles. In FIG. 13, a curve T1 represents the reflective structure having a reflectivity of 5%, a curve T2 represents the reflective structure having a reflectivity of 95%, and a curve T3 represents the reflective structure having a reflectivity of 50%. It may be clearly learned from FIG. 13 that when the reflective structure has a low reflectivity, e.g., 5%, a light intensity of the whole light in a light-emitting angle greater than ±30 degrees is less than 5% of a light intensity of the light in a light-emitting angle of 0 degree, and the display apparatus displays in a narrow viewing angle. When the reflective structure has a high reflectivity, e.g., 95%, the light intensity of the whole light in the light-emitting angle greater than ±30 degrees is greater than 5% of the light intensity of the light in the light-emitting angle of 0 degree, and the display apparatus displays in a wide viewing angle.

Based on the above, the embodiments of the invention achieve at least one of the following advantages or effects. The backlight module of the invention has the reflective structure 140 with an adjustable reflectivity, and therefore, the backlight module can provide light distribution of the anti-peep mode, the wide-viewing angle mode or both the anti-peep and the wide-viewing angle mode, such that the display apparatus using the backlight module can switch the viewing angle.

The embodiments described above are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all Willis are meant in their broadest reasonable sense unless otherwise indicated. Any of the embodiments or any of the claims of the invention does not need to achieve all of the objects, advantages or features disclosed by the invention. Moreover, the abstract and the headings are merely used to aid in searches of patent files and are not intended to limit the scope of the claims of the present invention. In addition, terms such as "first" and "second" mentioned in the specification or the claims are only for naming the names of the elements or distinguishing different embodiments or scopes and are not intended to limit the upper limit or the lower limit of the number of the elements.

What is claimed is:

1. A backlight module, comprising:
   a light guide plate, having a light emitting surface, a bottom surface opposite to the light emitting surface, a light incident surface connected with the light emitting surface and the bottom surface and a plurality of micro structures located on the bottom surface or the light emitting surface;
   a light source, disposed beside the light incident surface of the light guide plate;
   a prism sheet, disposed above the light emitting surface of the light guide plate and comprising a plurality of prisms facing the light emitting surface; and
   a reflective structure, disposed under the bottom surface of the light guide plate and having a characteristic of changing its reflectivity according to a control signal applied thereto, wherein the reflective structure comprises a diffusion reflector and an electrochromic plate disposed between the light guide plate and the diffusion reflector,
   wherein the reflective structure comprises a low-reflectivity mode and a high-reflectivity mode, when a light beam from the light source passing through the light incident surface enters the light guide plate, and the light beam transmitted in the light guide plate is refracted to the reflective structure by the micro structures, the reflective structure absorbs the light beam refracted by the micro structures if the reflective structure is in the low-reflectivity mode, and the reflective structure scatters the light beam refracted by the micro structures to the prism sheet if the reflective structure is in the high-reflectivity mode,
   wherein the reflective structure further comprises a partial low-reflectivity and partial high-reflectivity mode, when the light beam from the light source passing through the light incident surface enters the light guide plate, and the light beam transmitted in the light guide plate is refracted to the reflective structure by the micro structures, a part of the reflective structure absorbs the light beam refracted by the micro structures, and the other part of the reflective structure scatters the light beam refracted by the micro structures to the prism sheet if the reflective structure is in the partial low-reflectivity and partial high-reflectivity mode.

2. The backlight module according to claim 1, wherein the electrochromic plate comprises a first transparent substrate, a first transparent conductive layer, an ion storage layer, an electrolyte layer, an electrochromic material layer, a second transparent conductive layer and a second transparent substrate sequentially stacked, and the first transparent substrate is disposed on the diffusion reflector.

3. The backlight module according to claim 1, wherein when the reflective structure is in the low-reflectivity mode, a light intensity of the light beam emitting from the prism sheet in a light-emitting angle greater than ±30 degrees is less than 5% of a light intensity thereof in a light-emitting angle of 0 degree in a direction perpendicular to the light emitting surface of the light guide plate.

4. The backlight module according to claim 1, wherein when the reflective structure is in the high-reflectivity mode, a light intensity of the light beam emitting from the prism sheet in a light-emitting angle greater than ±30 degrees is greater than 5% of a light intensity thereof in a light-emitting angle of 0 degree in a direction perpendicular to the light emitting surface of the light guide plate.

5. The backlight module according to claim 1, further comprising:
   an optical film, disposed between the reflective structure and the light guide plate and comprising an anti-reflective film, an anti-glare film, a low-reflectivity film or a combination of the films.

6. The backlight module according to claim 1, further comprising:
   an optical film, disposed on a side of the prism sheet relatively far away from the light emitting surface of the light guide plate and comprising an anti-reflective film, a low-reflectivity film or a combination of the films.

7. The backlight module according to claim 1, further comprising:
an auxiliary light guide plate, disposed between the light guide plate and the reflective structure and having an auxiliary light emitting surface, an auxiliary bottom surface opposite to the auxiliary light emitting surface, an auxiliary light incident surface connected with the auxiliary light emitting surface and the auxiliary bottom surface and a plurality of scattering micro structures located on the auxiliary bottom surface or the auxiliary light emitting surface; and
an auxiliary light source, disposed beside the auxiliary light incident surface of the auxiliary light guide plate.

8. The backlight module according to claim 7, wherein the auxiliary light guide plate and the reflective structure are bonded through an optical adhesive.

9. The backlight module according to claim 7, wherein the auxiliary light guide plate and the light guide plate have a gap therebetween.

10. A display apparatus, comprising:
a backlight module, comprising:
a light guide plate, having a light emitting surface, a bottom surface opposite to the light emitting surface, a light incident surface connected with the light emitting surface and the bottom surface and a plurality of micro structures located on the bottom surface or the light emitting surface;
a light source, disposed beside the light incident surface of the light guide plate;
a prism sheet, disposed above the light emitting surface of the light guide plate and comprising a plurality of prisms facing the light emitting surface; and
a reflective structure, disposed under the bottom surface of the light guide plate and having a characteristic of changing its reflectivity according to a control signal applied thereto, wherein the reflective structure comprises a diffusion reflector and an electrochromic plate disposed between the light guide plate and the diffusion reflector,
wherein the reflective structure comprises a low-reflectivity mode and a high-reflectivity mode, when a light beam from the light source passing through the light incident surface enters the light guide plate, and the light beam transmitted in the light guide plate is refracted to the reflective structure by the micro structures, the reflective structure absorbs the light beam refracted by the micro structures if the reflective structure is in the low-reflectivity mode, and the reflective structure scatters the light beam refracted by the micro structures to the display panel if the reflective structure is in the high-reflectivity mode,
wherein the reflective structure further comprises a partial low-reflectivity and partial high-reflectivity mode, when the light beam from the light source passing through the light incident surface enters the light guide plate, and the light beam transmitted in the light guide plate is refracted to the reflective structure by the micro structures, a part of the reflective structure absorbs the light beam refracted by the micro structures, and the other part of the reflective structure scatters the light beam refracted by the micro structures to the prism sheet if the reflective structure is in the partial low-reflectivity and partial high-reflectivity mode; and
a display panel, disposed above the backlight module.

11. The display apparatus according to claim 10, wherein the display panel comprises:
a color filter substrate;
a thin film transistor array substrate, comprising:
a substrate, disposed between the backlight module and the color filter substrate;
a patterned metal circuit layer, disposed on the substrate; and
a light-absorption pattern layer, disposed between the substrate and the patterned metal circuit layer; and
a display medium layer, disposed between the thin film transistor array substrate and the color filter substrate.

12. The display apparatus according to claim 11, wherein an orthogonal projection of the light-absorption pattern layer on the substrate overlaps an orthogonal projection of the patterned metal circuit layer on the substrate.

13. The display apparatus according to claim 10, wherein the display panel comprises:
a thin film transistor array substrate, comprising:
a substrate; and
a patterned metal circuit layer, disposed on the substrate;
a color filter substrate, disposed between the backlight module and the thin film transistor array substrate and comprising:
an opposite substrate; and
a light-shielding pattern layer, disposed on the opposite substrate and having a plurality of openings; and
a plurality of color filter patterns, disposed on the opposite substrate and located in the openings of the light-shielding pattern layer, wherein an orthogonal projection of the light-shielding pattern layer on the substrate overlaps an orthogonal projection of the patterned metal circuit layer on the substrate; and
a display medium layer, disposed between the thin film transistor array substrate and the color filter substrate.

14. The display apparatus according to claim 10, wherein when the reflective structure is in the low-reflectivity mode, a light intensity of the light beam emitting from the display panel in a light-emitting angle greater than ±30 degrees is less than 5% of a light intensity thereof in a light-emitting angle of 0 degree in a direction perpendicular to the light emitting surface of the light guide plate, and the display apparatus displays in a narrow viewing angle.

15. The display apparatus according to claim 10, wherein when the reflective structure is in the high-reflectivity mode, a light intensity of the light beam emitting from the display panel in a light-emitting angle greater than ±30 degrees is greater than 5% of a light intensity thereof in a light-emitting angle of 0 degree in a direction perpendicular to the light emitting surface of the light guide plate, and the display apparatus displays in a wide viewing angle.

* * * * *